UNITED STATES PATENT OFFICE.

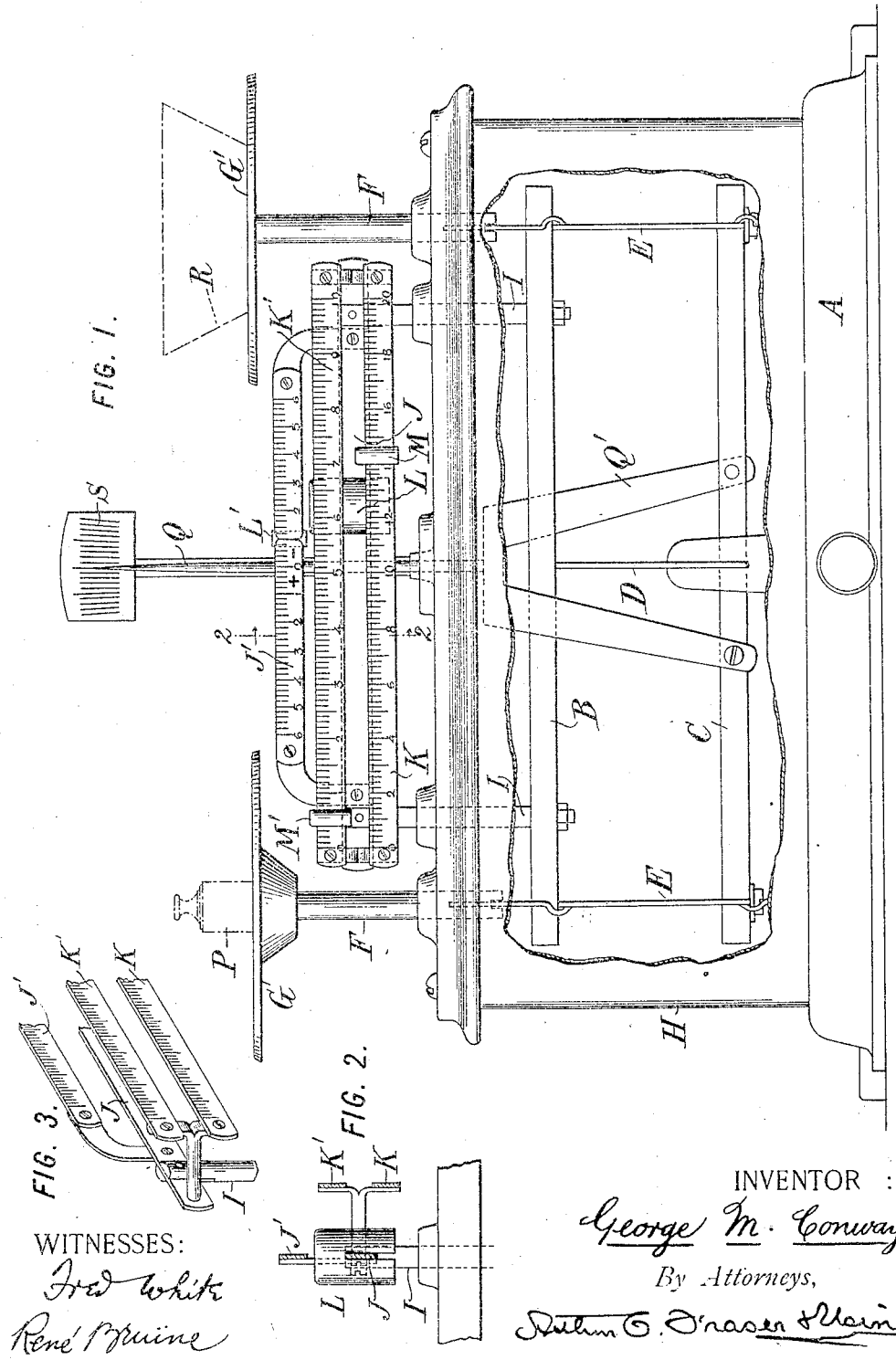

GEORGE M. CONWAY, OF JERSEY CITY, NEW JERSEY, ASSIGNOR TO THE TORSION BALANCE COMPANY, OF NEW YORK, N. Y., A CORPORATION OF NEW YORK.

WEIGHING-SCALE.

1,116,567.  Specification of Letters Patent.   Patented Nov. 10, 1914.

Application filed September 23, 1909. Serial No. 519,236.

*To all whom it may concern:*

Be it known that I, GEORGE M. CONWAY, a citizen of the United States, residing at Jersey City, in the county of Hudson and State of New Jersey, have invented certain new and useful Improvements in Weighing-Scales, of which the following is a specification.

This invention provides an improved scale for determining in percentages the loss of weight in a material under test between a first and second weighing. It has been common in percentage scales to counterbalance the material being weighed by a sliding weight or rider which initially occupies the position most remote from the fulcrum point, and which as the material under test loses weight, is shifted along the beam toward the fulcrum point. By graduating the beam decimally the position of the weight may indicate the percentage of loss of weight in the material.

The present invention provides a percentage scale wherein the main or counterbalancing weight is not required to be moved or adjusted, a separate sliding weight or rider (or two or more such weights) being provided to compensate for the loss of weight in the material, such compensation being effected by adjusting the rider along a graduated scale so that it subtracts from the main weight, and by its position on the scale indicates the percentage of loss. The scale is also provided with one or more tare beams and riders whereby to initially compensate for the weight of the receptacle in which the material under test is contained. Preferably both the percentage beam and the tare beam are duplicated, the respective beams having a major and a minor rider to facilitate the accurate weighing of the tare and of the percentage loss respectively.

Figure 1 of the accompanying drawings is an elevation of a torsion balance scale constructed according to this invention, the front of the inclosing case being broken away to show the interior parts; Fig. 2 is a fragmentary transverse section on the line 2—2 in Fig. 1; Fig. 3 is a fragmentary oblique projection of the graduated beams.

Referring to the drawings let A designate the base or standard, and B and C parallel scale beams pivoted thereto at their middles on an upright truss or harp D, and connected together by movable upright harps E E. The harps or trusses D E are of the construction well known in torsion scales and do not require to be described. The harps E E are prolonged upwardly as posts F F which carry the pan-holders G G'. The beams B C and their connections are inclosed in a box or case H forming part of the standard A, and through the top of which the posts F F project. The construction thus described is well known as applied to torsion balance scales, and forms no part of my invention; it may in fact be substituted by any known or equivalent construction of scale or balance, it being understood that the use of two parallel beams B C is not necessary to my invention.

The beam B carries a multiple graduated beam or beams, which in the construction shown are connected to it by means of rods I I. Four such beams are shown, of which two J and J' are tare beams, and the others K and K' are percentage beams. Obviously these beams are essentially one with the beam B to which they are attached, being lifted above the beam B chiefly for convenience when the latter is inclosed in the case H, and to bring them above the case where they are accessible and readily visible. The main tare beam J is provided with a sliding tare weight or runner L, and the auxiliary tare beam J' is provided with a much smaller and lighter tare runner L'. The main percentage beam K is provided with a sliding weight or runner M, while the auxiliary percentage beam K' is provided with a smaller sliding weight or runner M'.

With the precise construction shown the scale when out of use is designed to balance when the main tare weight is at the extreme right, the auxiliary tare weight at the middle, and the two percentage weights at the extreme left, these being the zero positions on the respective scale beams. The right pan holder G' is designed to receive the receptacle for holding the material to be weighed, and the left pan holder G is designed to carry the main or counterbalancing weight. This weight is indicated in dotted lines at P and the receptacle in dotted lines at R. The function of the main tare weight L is to approximately counterbalance the receptacle, for which purpose it is moved to the left along its beam. For making a series of tests the weight L may be adjusted to substantially counterbalance the average weight of the receptacles, the precise weight of each receptacle being compensated for by a final adjustment of the auxiliary tare rider L', and the tare for each receptacle separately recorded; for this purpose the auxiliary tare beam should be graduated to both sides of the middle or zero position as shown, so that the plus or minus weight indicated by the position of the auxiliary tare runner may be separately recorded.

In describing the operation, I will assume as a suitable example that the scale is to be used for determining the percentage of moisture in butter. A receptacle is first placed on the pan holder G' and its tare weighed off and recorded as described. After this the position of the main tare weight L is left unchanged during the entire series of tests. Any prescribed weight P (say for example ten grams) is then placed on the pan holder G, and the same weight of butter is placed in the receptacle, so that the scale balances. The receptacle containing the butter is then placed in an oven and heated to drive off the moisture. While this is being done other samples may be weighed, the tare of each receptacle being recorded. The heated sample of butter is then placed again on the pan holder G', having now lost weight by the loss of its moisture. The auxiliary tare weight L' is re-set according to the recorded position. The scale is now out of balance because of the loss of weight of the butter, and this loss is compensated for by sliding one or both of the percentage runners M M' toward the right until the scale is again brought to balance. If only one of the weights M or M' has been displaced, the percentage of loss may be read off from its scale beam without any computation; but if both weights have been displaced it is of course necessary to add together the percentages indicated on their respective beams. Thus in Fig. 1 the weight M stands at 14 and M' at .4, so that the percentage of loss is 14.4. After each weighing operation the runners are restored for the next operation.

The scale will of course be proportioned according to the uses to which it is to be put, so that the percentage beams will be graduated accordingly. For example, in the construction shown, the lower beam is graduated to 20 per cent., and the upper one to 10 per cent., making a total of 30 per cent., which represents the maximum loss of weight of the material under test for which this particular scale is adapted. The use of two percentage beams with respectively finer and coarser graduations, facilitates accuracy in weighing, it being convenient to adjust the main or heavier weight to an exact percentage, and to weigh off the fractional difference on the auxiliary beam, where the lighter runner moves over coarser graduations.

The scale is shown as provided with the usual pointer Q moving over a fixed graduation S, the pointer Q in this instance being mounted on a frame Q' fixed to the lower beam C, but any other or equivalent arrangement may be provided.

I am aware that various constructions of percentage scales have been proposed. Commonly such scales have required that the main weight be adjusted along its beam. In my scale the main weight P is undisturbed, except that it is removed when weighing the tare and applied when weighing the sample of material.

It will be understood that those features of the scale which form no novel part of my invention may be substituted by any of the well known equivalents in the scale making art. For example, my invention is not limited to the use of pan holders G and G' for receiving the weight P and receptacle R, any equivalent provisions for receiving or suspending these parts being applicable in lieu thereof.

I claim as my invention:—

1. A percentage scale comprising a multiple beam having graduated numbers, a main weight, provisions for applying to the opposite arms of said beam at fixed points the material to be weighed and said main weight respectively, a tare runner slidable on a graduated member of said beam, and a percentage runner slidable on another graduated member of said beam, said latter member being inversely graduated with the numbers counting upwardly from the end carrying the main weight and proportioned to said main weight and to said percentage runner, so that the poising position of the percentage runner thereon indicates the percentage of loss of weight of the material.

2. A percentage scale comprising a multiple beam having graduated numbers, a main weight, provisions for applying to the opposite arms of said beam at fixed points the material to be weighed and said main weight respectively, a tare runner slidable on a graduated member of said beam, and a percentage runner slidable on another graduated member of said beam, said latter member extending across the fulcrum point of the beam and inversely graduated with its numbers counting upwardly from the end carrying the main weight, and continuing across such fulcrum point and proportioned to said main weight and to said percentage runner, so that the poising position of the percentage runner thereon indicates the percentage of loss of weight of the material.

In witness whereof, I have hereunto signed my name in the presence of two subscribing witnesses.

GEORGE M. CONWAY.

Witnesses:
 ARTHUR C. FRASER,
 FRED WHITE.